US010160437B2

(12) United States Patent
Rinaldo

(10) Patent No.: US 10,160,437 B2
(45) Date of Patent: Dec. 25, 2018

(54) VEHICLE CONTROL SYSTEM WITH REVERSE ASSIST

(71) Applicant: MAGNA ELECTRONICS INC., Auburn Hills, MI (US)

(72) Inventor: Anthony N. Rinaldo, Royal Oak, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/442,813

(22) Filed: Feb. 27, 2017

(65) Prior Publication Data

US 2017/0247030 A1    Aug. 31, 2017

Related U.S. Application Data

(60) Provisional application No. 62/301,261, filed on Feb. 29, 2016.

(51) Int. Cl.
| | | |
|---|---|---|
| *B60W 30/09* | (2012.01) | |
| *B60W 10/20* | (2006.01) | |
| *B60W 50/14* | (2012.01) | |
| *B60W 10/18* | (2012.01) | |
| *B60W 10/184* | (2012.01) | |
| *B60W 30/18* | (2012.01) | |

(52) U.S. Cl.
CPC .......... *B60W 10/20* (2013.01); *B60W 10/184* (2013.01); *B60W 30/18036* (2013.01); *B60W 2050/146* (2013.01); *B60W 2420/42* (2013.01); *B60W 2420/52* (2013.01); *B60W 2420/54* (2013.01); *B60W 2540/04* (2013.01); *B60W 2550/10* (2013.01)

(58) Field of Classification Search
CPC .............. B60W 10/184; B60W 10/20; B60W 2050/146; B60W 2420/42; B60W 2420/52; B60W 2420/54; B60W 2540/04; B60W 2550/10; B60W 30/18036
USPC ...................................................... 701/36, 48
See application file for complete search history.

(56) References Cited

U.S. PATENT DOCUMENTS

| | | |
|---|---|---|
| 5,355,118 A | 10/1994 | Fukuhara |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |

(Continued)

Primary Examiner — Tyler J Lee
(74) Attorney, Agent, or Firm — Honigman Miller Schwartz and Cohn, LLP

(57) ABSTRACT

A control system for a vehicle includes a camera disposed at the vehicle and having a field of view rearward of the vehicle, and at least one non-imaging sensor disposed at the vehicle so as to sense a region at least rearward and partially sideward of the vehicle. During a reversing maneuver of the vehicle along a pathway, the control, responsive to processing of image data captured by the camera, determines edges of the pathway. During the reversing maneuver of the vehicle along the narrow pathway, the control, responsive to processing of data sensed by the non-imaging sensor, determines distances to objects present at or near the determined pathway and rearward and sideward of the vehicle. The control, responsive to determination of the pathway and determination of objects present along the pathway, is operable to steer the vehicle along the pathway to reverse the vehicle along the pathway.

20 Claims, 2 Drawing Sheets

(56) References Cited

U.S. PATENT DOCUMENTS

| | | |
|---|---|---|
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,670,935 A | 9/1997 | Schofield et al. |
| 5,724,316 A | 3/1998 | Brunts |
| 5,737,226 A | 4/1998 | Olson et al. |
| 5,760,826 A | 6/1998 | Nayer |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,201,642 B1 | 3/2001 | Bos |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,476,730 B2 | 11/2002 | Kakinami et al. |
| 6,477,464 B2 | 11/2002 | McCarthy et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |

(56) References Cited

U.S. PATENT DOCUMENTS

| | | |
|---|---|---|
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,825,880 B2 | 11/2004 | Asahi et al. |
| 6,847,487 B2 | 1/2005 | Burgner |
| 6,882,287 B2 | 4/2005 | Schofield |
| 6,889,161 B2 | 5/2005 | Winner et al. |
| 6,898,495 B2 | 5/2005 | Tanaka et al. |
| 6,909,753 B2 | 6/2005 | Meehan et al. |
| 6,940,423 B2 | 9/2005 | Takagi et al. |
| 6,946,978 B2 | 9/2005 | Schofield |
| 6,947,064 B1 | 9/2005 | Hahn et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,257,486 B2 | 8/2007 | Shimazaki et al. |
| 7,295,227 B1 | 11/2007 | Asahi et al. |
| 7,366,595 B1 | 4/2008 | Shimizu et al. |
| 7,369,940 B2 | 5/2008 | Frank et al. |
| 7,526,103 B2 | 4/2009 | Schofield et al. |
| 7,598,887 B2 | 10/2009 | Sato et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,680,570 B2 | 3/2010 | Mori |
| 7,720,580 B2 | 5/2010 | Higgins-Luthman |
| 7,914,187 B2 | 3/2011 | Higgins-Luthman et al. |
| 8,285,479 B2 | 10/2012 | Kawabata et al. |
| 8,451,107 B2 | 5/2013 | Lu et al. |
| 8,874,317 B2 | 10/2014 | Marczok et al. |
| 9,834,216 B2 * | 12/2017 | Pawlicki ............... B60W 30/18 |
| 2002/0113873 A1 | 8/2002 | Williams |
| 2003/0080877 A1 | 5/2003 | Takagi et al. |
| 2003/0137586 A1 | 7/2003 | Lewellen |
| 2003/0222982 A1 | 12/2003 | Hamdan et al. |
| 2004/0130464 A1 | 7/2004 | Schindler et al. |
| 2004/0153243 A1 | 8/2004 | Shimazaki et al. |
| 2005/0203704 A1 | 9/2005 | Frank |
| 2005/0285758 A1 | 12/2005 | Matsukawa et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0287825 A1 | 12/2006 | Shimizu et al. |
| 2006/0287826 A1 | 12/2006 | Shimizu et al. |
| 2007/0021881 A1 | 1/2007 | Mori |
| 2007/0104476 A1 | 5/2007 | Yasutomi et al. |
| 2009/0113509 A1 | 4/2009 | Tseng et al. |
| 2010/0013670 A1 | 1/2010 | Hueppauff et al. |
| 2010/0045797 A1 | 2/2010 | Schofield et al. |
| 2010/0235053 A1 | 9/2010 | Iwakiri et al. |
| 2010/0286872 A1 | 11/2010 | Endo et al. |
| 2011/0087415 A1 * | 4/2011 | Yokoyama ................ B60T 7/22 701/71 |
| 2013/0046441 A1 | 2/2013 | Marczok et al. |
| 2013/0116859 A1 | 5/2013 | Ihlenburg et al. |
| 2014/0067206 A1 | 3/2014 | Pflug et al. |
| 2014/0354811 A1 | 12/2014 | Weber |
| 2014/0375476 A1 | 12/2014 | Johnson et al. |
| 2015/0022664 A1 | 1/2015 | Pflug et al. |
| 2015/0042808 A1 | 2/2015 | Pflug et al. |
| 2015/0081174 A1 | 3/2015 | Marczok et al. |
| 2015/0124096 A1 | 5/2015 | Koravadi |
| 2015/0158499 A1 | 6/2015 | Koravadi |
| 2015/0228066 A1 * | 8/2015 | Farb ................ G06K 9/00805 348/148 |
| 2015/0251599 A1 | 9/2015 | Koravadi |
| 2015/0344028 A1 | 12/2015 | Gieseke et al. |
| 2016/0096477 A1 | 4/2016 | Biemer |
| 2016/0162747 A1 | 6/2016 | Singh et al. |
| 2016/0264003 A1 * | 9/2016 | Yokoyama ................ B60K 6/52 |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0083774 A1 | 3/2017 | Solar et al. |
| 2017/0129489 A1 * | 5/2017 | Pawlicki ............... B60W 30/18 |
| 2017/0253237 A1 | 9/2017 | Diessner |

* cited by examiner

VEHICLE CONTROL SYSTEM WITH REVERSE ASSIST

CROSS REFERENCE TO RELATED APPLICATION

The present application claims the filing benefits of U.S. provisional application Ser. No. 62/301,261, filed Feb. 29, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more rearward facing cameras to capture image data representative of images exterior and rearward of the vehicle and uses a rear/side non-imaging sensor (such as ultrasonic sensors or short range radar or SRR sensors or the like) to provide a control feature to autonomously back up the vehicle along long driveways (or along narrow alleys or the like). The camera is used to determine the driveway edges to determine the desired or targeted reversing path of travel for the vehicle, and the non-imaging sensor or sensors is/are used to determine distances between the vehicle and any objects, such as a building or fence or the like, near the vehicle's projected path of travel along the determined driveway.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
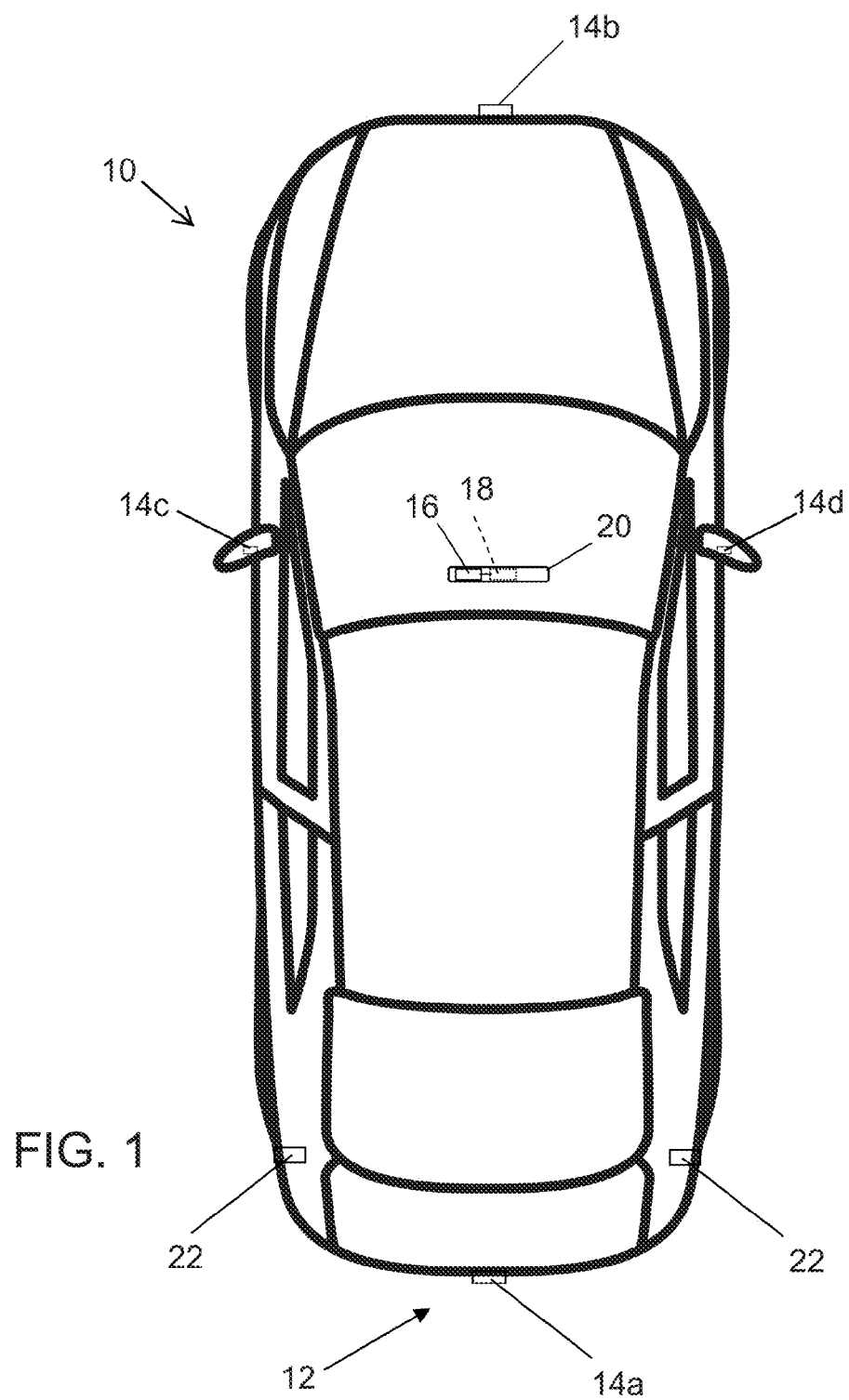
FIG. 1 is a plan view of a vehicle with a vision system that incorporates cameras in accordance with the present invention.
Figure 2:
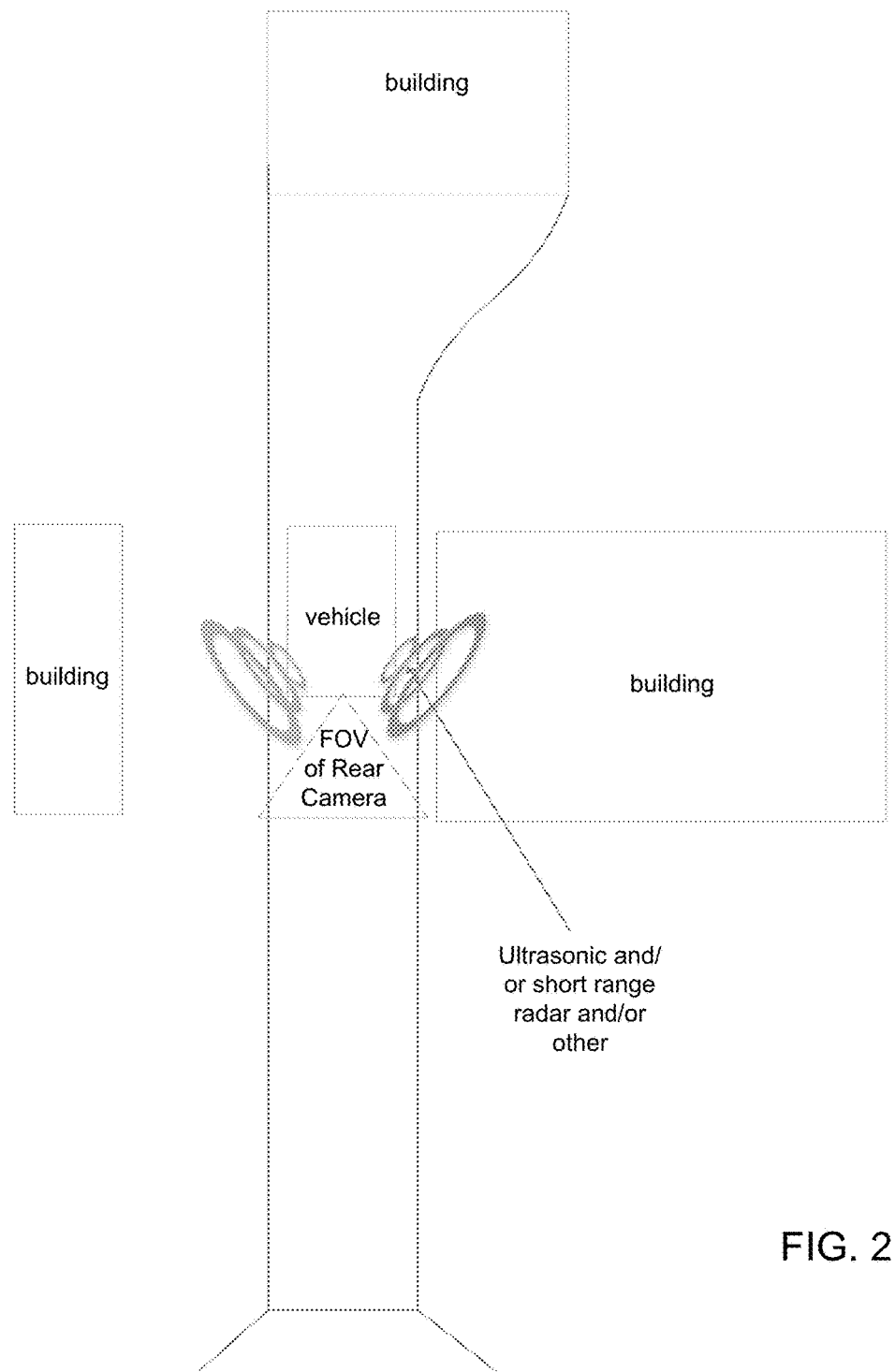
FIG. 2 is a plan view of the vehicle of FIG. 1, shown during a reversing maneuver along a driveway in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The system also includes a non-imaging sensor 22 (such as an ultrasonic sensor and/or short range radar sensor and/or the like) disposed at each side of the vehicle and having a sensing field rearward and sideward of the vehicle. The control may process data captured by the sensors 22 to determine distances to objects present at the side regions sideward and rearward of the vehicle during a reversing maneuver, as discussed below. The data transfer or signal communication from the camera to the ECU may comprise any suitable data or communication link, such as a vehicle network bus or the like of the equipped vehicle.

Many older homes with detached garages have long narrow driveways that can be difficult for a driver of a vehicle to navigate in reverse. It is also possible that a driver could pull into an alley where the driver has to reverse the vehicle along the alley in order to leave the alley (such as when an alley dead ends or becomes too narrow to proceed forward along). The system of the present invention utilizes image-based sensors and non-image-based sensors as inputs to a control, whereby the control, responsive to processing data captured by the sensors, determines the path for the vehicle and provides an output for autonomously backing the vehicle along and out of the driveway or alley.

In the illustrated embodiment, the system includes a rear facing camera 14a, which is used to capture image data of the region rearward of the vehicle and in the rearward path of travel of the vehicle. An image processor processes image data captured by the rear facing camera to determine the edges of the driveway or alley, such as similar to the way image processing of image data captured by a forward facing camera determines road edges or lane markers or edges.

The system also includes ultrasonic sensors 22, which are used to determine when the vehicle is passing by objects, such as a house or fence, next to or near the driveway.

Optionally, the system may also or otherwise include short range RADAR sensors, which may be used as an alternative or in conjunction with the ultrasonic sensors.

The control receives data captured by the rear facing camera 14a and the non-imaging sensors 22, and processes the captured data to determine the driveway edges and to determine the presence of and distances to objects along or near the driveway (or alley or the like). Responsive to such processing, the control controls the steering of the vehicle and the accelerator and brake system of the vehicle, to maneuver the vehicle along the determined driveway or pathway to reverse the vehicle along the driveway or pathway without departing beyond the determined edges of the driveway. The control maneuvers the vehicle along the determined driveway or pathway and within a specified proximity of (or distance from) the objects while avoiding collision with the determined objects. For example, the control may steer the vehicle along the determined path or driveway while maintaining the vehicle at least a threshold distance (such as at least two feet or at least three feet) from a determined object or fence or building or the like. The control, via processing of captured image data (captured by the rear facing camera 14a) and/or captured sensor data (captured by the non-imaging sensor(s)), may detect debris, such as branches or the like, on the driveway, and/or may detect potholes and the like on the driveway, whereby the system may maneuver the vehicle to avoid the determined debris or pothole or object/obstacle, such as by stopping the vehicle or steering the vehicle around the detected obstacles or objects or potholes so as to avoid the detected obstacles or objects or potholes while keeping the vehicle on the driveway.

Thus, the driver of the vehicle may select an autonomous control function (such as via a user input or the like), whereby the system of the present invention controls the vehicle during the reversing maneuver and guides or steers the vehicle along the determined path or driveway or alley (while avoiding objects) until the vehicle is at the end of the alley or driveway (which may be determined responsive to processing of captured image data or captured sensor data or may be determined via the user or driver deactivating the control function). The driver then can retake control of the vehicle when the vehicle has reached the end of the alley or driveway (or at any time when the driver deactivates the control function while the vehicle is being steered during the reversing maneuver along the path or alley or driveway).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0218529; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0222592; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/420,238, filed Jan. 31, 2017, and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, Ser. No. 62/349,874, filed Jun. 14, 2016, Ser. No. 62/330,557, filed May 2, 2016, Ser. No. 62/313,279, filed Mar. 25, 2016, Ser. No. 62/303,546, filed Mar. 4, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2006-0061008; US-2006-0050018 and/or US-2012-0162427, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Ser. No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A control system for a vehicle, said control system comprising:
   a camera disposed at a rear portion of a vehicle and having a field of view rearward of the vehicle;
   at least one non-imaging sensor disposed at the vehicle so as to sense a region at least rearward and sideward of the vehicle;
   a control unit having an image processor operable to process image data captured by said camera, said control unit operable to process data sensed by said non-imaging sensor;
   wherein, during a reversing maneuver of the vehicle along a pathway, said control unit, responsive to processing by said image processor of image data captured by said camera, determines edges of the pathway;
   wherein, during the reversing maneuver of the vehicle along the pathway, said control unit, responsive to processing of data sensed by said non-imaging sensor, determines distances to objects present at or near the pathway and in the path of reverse travel of the vehicle; and
   wherein said control unit, responsive to determination of the edges of the pathway and determination of objects present along the pathway, is operable to steer the vehicle along the pathway to reverse the vehicle along the pathway without the vehicle departing beyond the determined edges of the pathway.

2. The control system of claim 1, wherein said non-imaging sensor comprises at least one ultrasonic sensor.

3. The control system of claim 1, wherein said non-imaging sensor comprises an ultrasonic sensor at each side rearward corner region of the vehicle.

4. The control system of claim 1, wherein said non-imaging sensor comprises at least one short range RADAR sensor.

5. The control system of claim 1, wherein said non-imaging sensor comprises a short range RADAR sensor at each side rearward corner region of the vehicle.

6. The control system of claim 1, wherein said control unit is operable to determine the pathway and objects responsive to a user input of the vehicle.

7. The control system of claim 1, wherein said control unit, responsive to determination of the pathway and determination of distances to objects present along the pathway, is operable to control the braking system of the vehicle while steering the vehicle along the pathway.

8. The control system of claim 1, wherein said control unit, responsive to processing by said image processor of image data captured by said camera, determines edges of a narrow driveway or alley.

9. The control system of claim 8, wherein said control unit, responsive to processing of data sensed by said non-imaging sensor, determines distances to at least one of a building and a fence at or near the determined narrow driveway or alley and rearward and sideward of the vehicle.

10. The control system of claim 1, wherein said control unit determines the presence of an object in the pathway, and wherein, responsive to determination of an object present in the pathway, said control unit maneuvers the vehicle to avoid the determined object.

11. A control system for a vehicle, said control system comprising:
   a camera disposed at a rear portion of a vehicle and having a field of view rearward of the vehicle;
   at least one non-imaging sensor disposed at the vehicle so as to sense a region at least rearward and sideward of the vehicle;
   a control unit having an image processor operable to process image data captured by said camera, said control unit operable to process data sensed by said non-imaging sensor;
   wherein said control unit is operable in a vehicle reversing mode responsive to a user input of the vehicle;

wherein, when operating in the vehicle reversing mode at a driveway, said control unit, responsive to processing by said image processor of image data captured by said camera, determines edges of the driveway;

wherein, when operating in the vehicle reversing mode, said control unit, responsive to processing of data sensed by said non-imaging sensor, determines distances to objects present at or near the driveway and in the path of reverse travel of the vehicle; and wherein said control unit, when operating in the vehicle reversing mode and responsive to determination of the edges of the driveway and determination of objects present along the driveway, is operable to steer the vehicle along the driveway to reverse the vehicle along the driveway without the vehicle departing beyond the determined edges of the driveway and while maintaining the vehicle at least a predetermined distance from objects present at or near the driveway and in the path of reverse travel of the vehicle.

12. The control system of claim 11, wherein said non-imaging sensor comprises at least one ultrasonic sensor.

13. The control system of claim 11, wherein said non-imaging sensor comprises an ultrasonic sensor at each side rearward corner region of the vehicle.

14. The control system of claim 11, wherein said non-imaging sensor comprises at least one short range RADAR sensor.

15. The control system of claim 11, wherein said non-imaging sensor comprises a short range RADAR sensor at each side rearward corner region of the vehicle.

16. The control system of claim 11, wherein said control unit, when operating in the vehicle reversing mode, determines the presence of an object in the driveway, and wherein, responsive to determination of the object present in the driveway, said control unit maneuvers the vehicle to avoid the determined object.

17. A control system for a vehicle, said control system comprising:

a camera disposed at a rear portion of a vehicle and having a field of view rearward of the vehicle;

at least one non-imaging sensor disposed at the vehicle so as to sense a region at least rearward and sideward of the vehicle;

a control unit having an image processor operable to process image data captured by said camera, said control unit operable to process data sensed by said non-imaging sensor;

wherein said control unit is operable in a vehicle reversing mode responsive to a user input of the vehicle;

wherein, when operating in the vehicle reversing mode at a driveway, said control unit, responsive to processing by said image processor of image data captured by said camera, determines edges of the driveway;

wherein, when operating in the vehicle reversing mode, said control unit determines the presence of at least one of a building and a fence at or near the driveway and rearward and sideward of the vehicle;

wherein said control unit, responsive to processing of data sensed by said non-imaging sensor, determines distances to the determined at least one of a building and a fence at or near the driveway and rearward and sideward of the vehicle; and wherein said control unit, when operating in the vehicle reversing mode and responsive to determination of the edges of the driveway determination of distances to the at least one of a building and a fence present at or near the driveway, is operable to steer the vehicle along the driveway to reverse the vehicle along the driveway without the vehicle departing beyond the determined edges of the driveway and while maintaining the vehicle at least a predetermined distance from the building or fence present at or near the driveway.

18. The control system of claim 17, wherein said non-imaging sensor comprises at least one ultrasonic sensor.

19. The control system of claim 17, wherein said non-imaging sensor comprises at least one short range RADAR sensor.

20. The control system of claim 17, wherein, when operating in the vehicle reversing mode, said control unit determines the presence of an object in the driveway, and wherein, responsive to determination of the object present in the driveway, said control unit maneuvers the vehicle to avoid the determined object.

* * * * *